United States Patent [19]
Rudolph

[11] Patent Number: 5,949,498
[45] Date of Patent: Sep. 7, 1999

[54] DIVERSITY SYSTEM

[75] Inventor: Georg Rudolph, Seelze, Germany

[73] Assignee: Fuba Automotive GmbH, Bad Salzdetfurth, Germany

[21] Appl. No.: 08/920,833

[22] Filed: Aug. 29, 1997

[30] Foreign Application Priority Data

Sep. 6, 1996 [DE] Germany ............................ 196 36 125

[51] Int. Cl.$^6$ ...................................................... H04N 5/44
[52] U.S. Cl. ........................... 348/725; 348/728; 348/706; 348/679; 455/277.1
[58] Field of Search ..................................... 348/725, 726, 348/727, 731, 732, 735, 705, 706, 678, 679, 681, 682, 683, 684, 685, 728; 358/181, 188, 174–179; 455/277.1, 277.2; H04N 5/44, 5/52

[56] References Cited

U.S. PATENT DOCUMENTS

| | | |
|---|---|---|
| 5,313,660 | 5/1994 | Lindenmeier et al. . |
| 5,465,411 | 11/1995 | Koike .................................... 455/277.2 |

FOREIGN PATENT DOCUMENTS

| | | | |
|---|---|---|---|
| 3732398 | 11/1989 | Germany . | |
| 4006295 | 8/1990 | Germany . | |
| 3926336 | 2/1991 | Germany . | |
| 4119398 | 2/1992 | Germany . | |
| 4101629 | 7/1992 | Germany . | |
| 56-10780 | 2/1981 | Japan ..................................... | 358/188 |
| 56-168440 | 12/1981 | Japan ................................... | 455/277.1 |
| 3-265224 | 11/1991 | Japan ................................... | 455/277.1 |
| 3-265225 | 11/1991 | Japan ................................... | 455/277.1 |

*Primary Examiner*—David E. Harvey
*Attorney, Agent, or Firm*—Collard & Roe, P.C.

[57] ABSTRACT

An antenna diversity system for the mobile reception of VHF and UHF television signals in different frequency ranges that are separated by gaps by a mobile television receiver connected to a plurality of antennas through an antenna switch, wherein the output of the receiver includes a color decoder for producing color and luminance video signals. There is provided a separate frequency diversity control circuit connected to the receiver for testing the UHF and VHF signals received by the antennas and for switching the antennas to receive the best quality video and audio signals. The diversity circuit tests and reverses the antenna switch within the blanking gap of the horizontal synchronization lines of the TV signal. Memory circuits are coupled to the color decoder of the receiver for receiving at least one synchronization line of the video signal from the color decoder wherein either the complete video signal or corresponding color and luminance signals thereof are continuously read line by line. A storage circuit stores at least the signal of one line received immediately prior to the antenna reversing process. The last line or several line signals are then read out from the memory circuits after the antenna is switched through to a new antenna. A comparator simultaneously compares the video signals or signal components stored in the memory circuits with the new antenna signals or its components, and detects the level difference of the respective line signals from both antennas. A control pulse is generated responsive to the level difference for effecting an accelerated level detection, and switching the antenna to the previously acting antenna using the automatic gain control (AGC) of the television receiver.

6 Claims, 2 Drawing Sheets

DIVERSITY SYSTEM

BACKGROUND OF THE INVENTION

1. Field of the Invention

The present invention relates to a diversity system for the mobile reception of HF-signals in different frequency ranges separated by gaps, and in particular for the mobile television reception in moving motor vehicles.

2. The Prior Art

Multi-antenna arrangements with diversity circuits are known in the prior art for receiving telecasts in moving motor vehicles, which are as interference-free as possible. The separate optimizing of the video and audio signals via a separate diversity assembly of components for each of the signals is also well known. U.S. Pat. No. 5,313,660 is cited in this connection as an example of the state of the art in this field: Several antennas, such as, for example, four antennas are connected to two antenna change-over switches via a hybrid circuit, wherein the one circuit is controlled by a diversity circuit for the video signals and the other by a diversity circuit for the audio signals. In this way, the best-possible quality of the amplitude-modulated video signals and the frequency-modulated audio signals is simultaneously achieved with the lowest expense with respect to the number of antennas used.

In view of the quality, this diversity principle is adequately supplemented by the invention according to German Patent Application P 3,926,336, by which the video signals that are received can be detected in the line circle within the horizontally synchronized pulse. Reversing between antennas is possible in the same cycle, and the most favorable signal can always be switched through to the receiver.

However, there are problems that occur when trying to achieve an enhancement and stabilization of video reception by a quick antenna changeover. The antenna to which the signal path is switched to, supplies in accordance with the selection circuits, a higher signal level than the one that was received and previously viewed. The difference between the level values is usually accompanied by a different phase position. The automatic gain control (AGC) of the receiver however, is not capable of quickly adjusting itself to the changed level without some delay. Moreover, the filters and demodulator resonant circuits also require a certain finite time to adjust to the new phase position. This may cause interference with the first line after the new antenna has been switched through. The following lines also often show deviations in brightness and contrast until the AGC circuit adapts to the new level value. Thus, the reproduction quality is impaired by the diversity function.

SUMMARY OF THE INVENTION

It is an object of the present invention to provide a system of solving the problems of the prior art by using supplemental circuitry so that the high picture quality in the video diversity portion remains unchanged even when there are surges in the signal level and changes in phase position in the video signal received at the moment of antenna changeover.

In the invention, it is possible to keep the video reproduction, to a high degree, free of interference while the diversity circuit operates in order to assure a smooth transition of the video signal when switching from an antenna receiving a signal of a lower signal strength, to an antenna having a signal which is better positioned and has a higher signal strength.

When the additional memory components of the circuit of the invention are in operation, a video line content or the content of approximately two lines are always repeated on the video screen, either completely, or with certain signal components. These line components do not impair the signal since, from previous experience, there is very little difference between the video lines that directly follow each other. Moreover, the comparator circuit of the invention compares the old and new signals, and accelerates the automatic gain control of the receiver so that it quickly adapts to the new signal level and phase values, so that the repeat mode is limited in time by the circuit arrangement of the invention.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

DETAILED DESCRIPTION OF PREFERRED EMBODIMENTS

Figure 1:
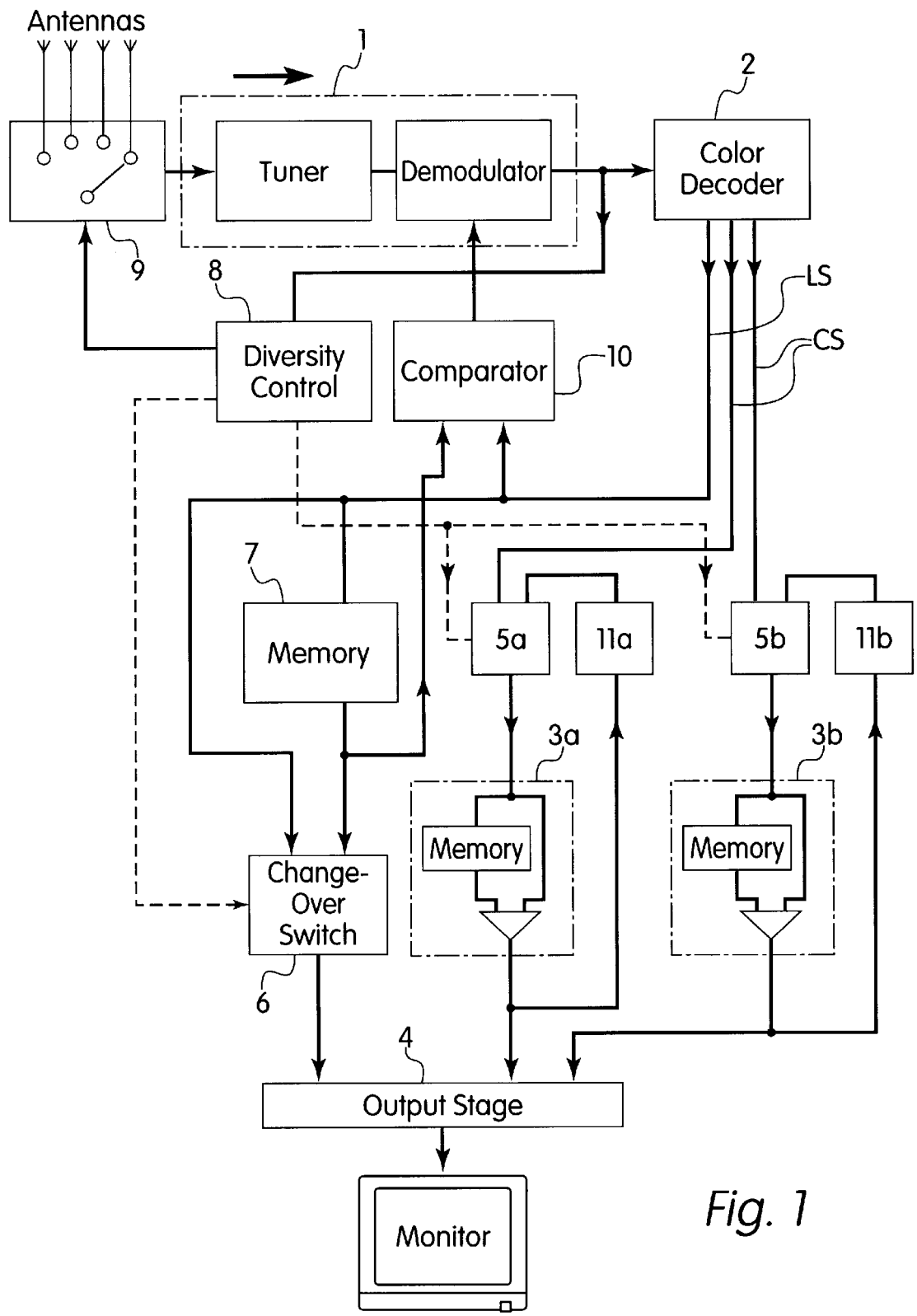
FIG. 1 shows a multi-antenna system with a diversity circuit with a PAL-system according to the invention.
Figure 2:
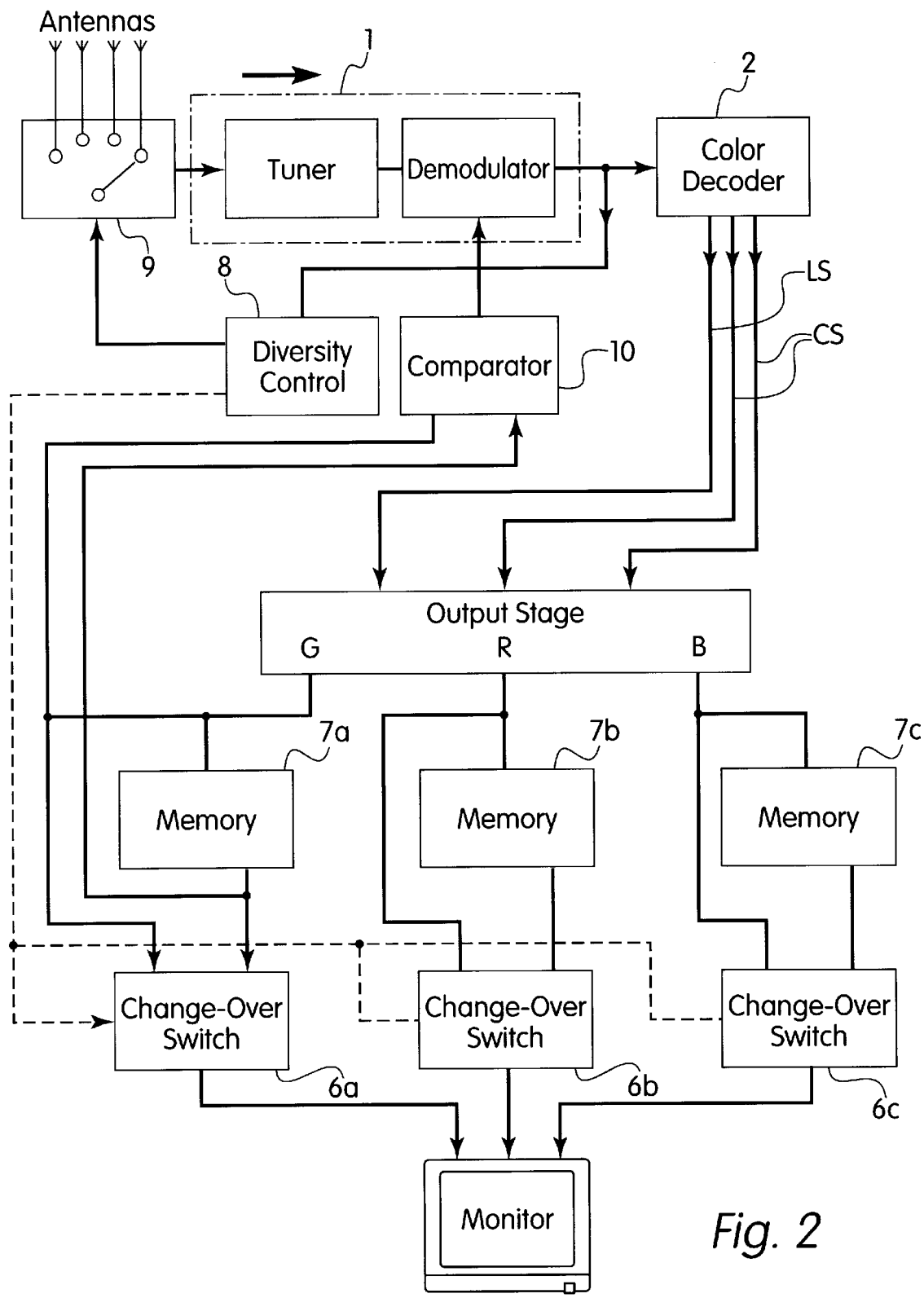
FIG. 2 shows a multi-antenna system with diversity for the NTSC-standard according to the invention.

Turning now in detail to FIGS. 1 and 2, there is shown a PAL-system wherein the video signal from antenna 9 is supplied by receiver 1, consisting of a tuner and a demodulator and decoded in color decoder 2. The output of decoder 2 provides three component signals, namely a luminance signal LS, and two color difference signals, CS. Color difference signals CS are stored for a duration of one line, in memory circuits 3a and 3b. The signal components delayed by one line are then superimposed with the corresponding components of the undelayed signal. The color difference output signals obtained in this way are transmitted to output stage 4 together with the luminance signal, which, with PAL, is passed on to the monitor without delay. Output stage 4 converts the luminance signal LS and the two color difference signals CS into the color components red, green and blue, and supplies same to the monitor.

According to the invention, the known PAL-circuit is supplemented by the following subassemblies and functions: A signal source switch 5a and 5b is connected in series to each of the inputs of memories 3a and 3b for storing the color difference signals CS. The additional memory 7 and the reversing switch 6 are coupled to the path of the luminance signal LS.

The circuit operates as follows: As long as no antenna change is called for by diversity control circuit 8, the color difference signal CS from color decoder 2 is directly supplied to memory components 3a, 3b, and the luminance signal LS is transmitted without delay to change-over or reversing switch 6.

However, when an antenna change occurs, the color difference signal CS stored in 3a and 3b from the preceding line is added to the respective line instead of the directly received signal by means of feedback and level adapter 11a, 11b, so that only stored color difference signals are supplied to the output stage. In addition, instead of the undelayed luminance signal LS, a luminance signal stored in memory circuit 7 is transmitted to the output stage 4, and delayed by one line. The delayed signal is the one received prior to the antenna change-over, i.e., the one not yet interfered with by the jump in level and phase due to the antenna change-over.

The circuit according to FIG. 1 can be used for all color standards (PAL, NTSC, SECAM). With sets receiving signals according to the NTSC-standards, no line delay as normally used with PAL (via the known storage of the color difference signals) is required. However, such line delay is suitable for enhancing the video reproduction. This is true particularly when a circuit according to the present invention is used. If this advantage is not required, memories 3a, 3b and change-over switch 5a, 5b, and memory 7 and change-over switch 6 can be designed for the reception of signals according to the NTSC-standard, without forming the mean value of two successive lines, omitting the feedback and level adapter 11a, 11b.

With reception according to the SECAM color standard, color decoder 2 supplies the color difference signals CS in an alternating fashion, so that each signal passed on is read into memories 3a and 3b, and further transmitted simultaneously. When no new signal is received in the memory, the last stored signal is emitted a second time. As with the PAL-system, it is advantageous to provide additional storage stages according to the invention. For example, the signal change-over switches 5a and 5b supply the delayed signal lines, when an antenna changeover occurs, to level adaptation circuits 11a, 11b, if necessary, or zero level signals to memory components 3a and 3b, depending on whether or not the color difference signals CS are transmitted in the line.

Switches 5a, 5b, and 6 are controlled by the antenna diversity control circuit 8 in such a way that the signal source switches reverse in response to the delayed signal, i.e., to the signal received last in the line, where the change-over to another antenna was effected by means of antenna change-over switch 9.

In another embodiment, the memory elements for storing a line can be arranged at the end of the output stage, with three memory elements present for the three color components red, green and blue.

This embodiment, which is suitable for NTSC reception, is shown in FIG. 2. Here, the signal supplied by receiver 1 and decoded in color decoder 2 into one luminance signal LS and two color difference signals CS is directly supplied to output stage 4 and converted into the color components red, green and blue. According to the invention, this circuit is supplemented by the following assemblies: The individual color components are switched through, without delay, to the monitor via change-over switches 6a, 6b, 6c in the lines in which no antenna change-over occurs. In lines where a switch to another antenna is made, the signals are received from memory modules 7a, 7b, 7c, which supply color signals that are delayed by one line. In this connection, preferably the delayed and the undelayed green signals are supplied to comparator 10.

As an alternative embodiment, the line storage consisting of one or a plurality of memory and change-over switches can be used ahead of the color decoder, or at any other point of the signal path.

Comparator 10 connected to the output of memory circuit 7 compares the delayed signal with the newly received signal LS, and controls receiver 1 in such a way that there is a smooth transition, without any jump in luminance, each time an antenna change is made in antenna circuit 9.

It is advantageous in this connection to wait for a certain time, about 10 to 20 µs, until this control becomes effective, i.e., until the demodulator and filters disposed in the signal path completed their transients to the phase position of the signal supplied by the new antenna.

While only a single embodiment of the present invention has been shown and described, it is to be understood that many changes and modifications may be made thereunto without departing from the spirit and scope of the invention as defined in the appended claims.

What is claimed is:

1. An antenna diversity system for the mobile reception of VHF and UHF television signals in different frequency ranges that are separated by gaps by a mobile television receiver connected to a plurality of antennas through an antenna switch, wherein the output of the receiver includes a color decoder for producing color and luminance video signals comprising:

a separate frequency diversity control circuit connected to the receiver for testing the UHF and VHF signals received by the antennas and for switching the antennas to receive the best quality video and audio signals, said diversity circuit testing and reversing the antenna switch within the blanking gap of the horizontal synchronization lines of the TV signal;

memory means coupled to the color decoder of the receiver for receiving at least one synchronization line of the video signal from the color decoder wherein either the complete video signal received or corresponding color and luminance signals thereof are continuously read line-by-line;

storage means for storing at least the signal of one line received immediately prior to the antenna switching and reversing process;

means for reading out the last line or several line signals from said memory means after switching said antenna switch through to a new antenna;

a comparator for simultaneously comparing the video signals or signal components stored in said memory means with the new antenna signals or components; and detecting the level difference of said respective line signals from both antennas, and generating a control pulse responsive to said difference, for effecting an accelerated level detection and switching the antenna switch to the previously acting antenna using the automatic gain control of the television receiver.

2. The antenna diversity system according to claim 1, wherein said memory means comprises a luminance signal memory circuit and a pair of color signal memory circuits.

3. The antenna diversity system according to claim 2, wherein in a PAL-system of transmission, the luminance signal is read into said luminance signal memory circuit in addition to the color difference signals stored line-by-line in said color memory circuits, and said luminance memory is connected in parallel with said color memory circuits.

4. The antenna diversity system according to claim 2, wherein in a NTSC-system of transmission, the combined storage of the color difference signals and luminance signal is used for enhancing the picture.

5. The antenna diversity system according to claim 1, wherein line-by-line storage and output delay take place in a memory component at the end of the output stage by storing the individual color components red, green and blue of the received signal and using said components for correcting the signal level and phase jumps.

6. The antenna diversity system according to claim 1, wherein said comparator circuit executes a line comparison with a set delay, such delay taking into account the transient response of the filter and resonant circuits of the system.

* * * * *